(12) United States Patent
Kim et al.

(10) Patent No.: US 11,977,808 B2
(45) Date of Patent: May 7, 2024

(54) DISPLAY DEVICE

(71) Applicant: SAMSUNG ELECTRONICS CO., LTD., Suwon-si (KR)

(72) Inventors: Jinsub Kim, Suwon-si (KR); Yongsik Kwon, Suwon-si (KR); Kibo Kim, Suwon-si (KR); Sejun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/109,032

(22) Filed: Feb. 13, 2023

(65) Prior Publication Data

US 2023/0195402 A1    Jun. 22, 2023

Related U.S. Application Data

(63) Continuation of application No. PCT/KR2021/007908, filed on Jun. 23, 2021.

(30) Foreign Application Priority Data

Aug. 13, 2020    (KR) .......................... 10-2020-0101813

(51) Int. Cl.
*G06F 3/14* (2006.01)
*H04N 5/38* (2006.01)

(52) U.S. Cl.
CPC ............. *G06F 3/1446* (2013.01); *H04N 5/38* (2013.01)

(58) Field of Classification Search
CPC .. G09G 5/006; G09G 5/003; G09G 2300/026; G09G 2370/16; H01Q 1/24;

(Continued)

(56) References Cited

U.S. PATENT DOCUMENTS

| 7,006,083 B2 | 2/2006 | Nishimura |
| 7,576,707 B2 | 8/2009 | Nishimura |

(Continued)

FOREIGN PATENT DOCUMENTS

| JP | 2004086172 A | 3/2004 |
| KR | 1020140074237 A | 6/2014 |

(Continued)

OTHER PUBLICATIONS

Written Opinion (PCT/ISA/237) dated Oct. 7, 2021 from the International Searching Authority to International Application No. PCT/KR2021/007908.

(Continued)

*Primary Examiner* — Vinh T Lam
(74) *Attorney, Agent, or Firm* — Sughrue Mion, PLLC

(57) ABSTRACT

Provided is a display device comprising a plurality of display modules and a base module. The base module includes a transmitter configured to transmit a plurality of image signals respectively corresponding to each of the plurality of display modules. A first display module is coupled to the base module to receive the image signals and to transmit at least a subset of the image signals to additional display modules, such as a second display module which is coupled to the first display module to receive the at least a subset of the plurality of image signals from the first display module. The plurality of display modules may be thereby coupled with each other to thus receive and further transmit the image signals to and from other display modules, thereby improving convenience in the manufacture, inspection, and repair of the display device.

13 Claims, 19 Drawing Sheets

(58) Field of Classification Search
CPC .......... H02J 50/20; G06F 1/26; G06F 3/1446; H04N 5/38
See application file for complete search history.

(56) References Cited

U.S. PATENT DOCUMENTS

| | | | |
|---|---|---|---|
| 8,238,087 B2 | 8/2012 | McClure et al. | |
| 9,059,114 B2 | 6/2015 | Do et al. | |
| 9,400,627 B2 | 7/2016 | Han et al. | |
| 10,607,571 B2* | 3/2020 | Utsch | G09G 5/12 |
| 11,237,790 B2* | 2/2022 | Seo | H01Q 13/06 |
| 11,269,578 B2 | 3/2022 | Kim | |
| 11,303,871 B2* | 4/2022 | Kim | H04N 21/816 |
| 11,373,016 B2* | 6/2022 | Lam | G06F 1/189 |
| 11,409,492 B2* | 8/2022 | Seo | H04N 21/4363 |
| 11,429,337 B2* | 8/2022 | Lucas | G02B 27/017 |
| 11,468,823 B2* | 10/2022 | Noh | G09G 3/3208 |
| 11,481,175 B2* | 10/2022 | Oh | G09G 3/006 |
| 2004/0001058 A1 | 1/2004 | Nishimura | |
| 2006/0066505 A1 | 3/2006 | Nishimura | |
| 2013/0176190 A1* | 7/2013 | Barts | H04N 5/38 343/905 |
| 2014/0160077 A1 | 6/2014 | Han et al. | |
| 2016/0026424 A1* | 1/2016 | Chen | G06F 3/1446 345/1.3 |
| 2016/0133226 A1* | 5/2016 | Park | G06F 3/01 345/1.3 |
| 2020/0004492 A1 | 1/2020 | Kim | |
| 2020/0133614 A1 | 4/2020 | Oh et al. | |
| 2020/0161520 A1 | 5/2020 | Hugon et al. | |
| 2020/0225903 A1* | 7/2020 | Cohen | G09G 5/12 |
| 2020/0335999 A1* | 10/2020 | Pan | H02J 50/20 |
| 2021/0141584 A1 | 5/2021 | Seo et al. | |
| 2022/0188059 A1 | 6/2022 | Kim | |
| 2022/0342625 A1* | 10/2022 | Schwarz | G09G 3/32 |

FOREIGN PATENT DOCUMENTS

| | | |
|---|---|---|
| KR | 101454283 B1 | 10/2014 |
| KR | 1020190132954 A | 11/2019 |
| KR | 1020200003599 A | 1/2020 |
| KR | 1020200004688 A | 1/2020 |
| KR | 1020200033882 A | 3/2020 |
| KR | 102098261 B1 | 4/2020 |
| KR | 102266972 B1 | 6/2021 |
| WO | 2015193434 A2 | 12/2015 |

OTHER PUBLICATIONS

International Search Report (PCT/ISA/210) dated Oct. 7, 2021 from the International Searching Authority to International Application No. PCT/KR2021/007908.

* cited by examiner

185

185

DISPLAY DEVICE

CROSS-REFERENCE TO RELATED APPLICATIONS

This application is a continuation application of International Application No. PCT/KR2021/007908, filed on Jun. 23, 2021, which is based on and claims priority to Korean Patent Application No. 10-2020-0101813, filed on Aug. 13, 2020 in the Korean Intellectual Property Office, the disclosures of each of which are incorporated by reference herein in their entireties.

BACKGROUND

1. Field

The present disclosure relates to a display device including a display module, and more particularly, to a display device in which a plurality of display modules are coupled with each other to transmit and receive image signals.

2. Description of Related Art

A display device may refer to an output device that expresses various colors while being operated in units of pixels or sub-pixels. The display device has been improved to have a high-quality resolution in accordance with the development of technology, and there has been a continuous technical requirement to reduce a thickness of a display while increasing a size of a display screen.

A typical display device may refer to any of various display devices such as a display device using a liquid crystal display panel, an organic light emitting diode panel, a plasma display panel, a light emitting diode panel, a micro light emitting diode (LED) panel, etc.

Among these devices, the light emitting diode (LED) type of display panel is popular as a light source not only for a lighting device but also for any of various display devices of various electronic products such as a television (TV), a mobile phone, a personal computer (PC), a laptop PC, personal digital assistant (PDA), and the like. However, this type of display panel has a low mass production yield and difficulty in being applied as a single panel to a large display. A large display device has thus been produced by coupling a plurality of display modules with each other.

However, the display device including the plurality of display modules needs to individually supply power and image signals to the plurality of display modules, respectively, which requires a process of connecting power connectors and signal connectors corresponding to the plurality of display modules to a backboard.

The connector on the back board may be damaged or the back board may need to be replaced, in a manufacturing process of the display device, including the connection process, or its usage. In this situation, the plurality of display panels need to be all separated, and accordingly, it is not easy to manufacture, inspect, and repair the plurality of display modules and the display device including the same.

SUMMARY

Provided is a display device in which a plurality of display modules are coupled with each other to transmit and receive image signals to and from other display modules.

According to an embodiment of the present disclosure, a display device includes a plurality of display modules and a base module including a transmitter configured to transmit a plurality of image signals respectively corresponding to each of the plurality of display modules. The plurality of display modules includes a first display module coupled to the base module to receive the plurality of image signals and to transmit at least a subset of the plurality of image signals to additional display modules of the plurality of display modules, and a second display module coupled to the first display module to receive the subset of the plurality of image signals from the first display module.

Each of the plurality of display modules may include a plurality of light emitting devices, a first communication device disposed on one surface thereof and configured to receive image signals from another display module of the plurality of display modules, a second communication device disposed on another surface opposite to the one surface and configured to transmit image signals to another display module of the plurality of display modules, and a controller configured to extract an image signal corresponding to the display module from the image signals received through the first communication device, and to provide each of the plurality of light emitting devices with a driving signal for outputting an image corresponding to the extracted image signal.

The transmitter may include a plurality of antennas each configured to transmit a respective one of the plurality of image signals.

Each image signal may be provided through the plurality of antennas by superimposing a direct current (DC) bias voltage and an alternating current (AC) signal.

At least a subset of the plurality of antennas may be disposed adjacent to each other, and the subset of antennas disposed adjacent to each other may have different respective phases of the AC signals applied thereto.

The base module may include a power transmitting device configured to supply power to each of the plurality of display modules. The first display module may be configured to receive power from the power transmitting device, and to supply at least a portion of the received power to the second display module.

The power transmitting device may be a wireless power transmitting device transmitting power wirelessly. Each of the plurality of display modules may include a wireless power receiving device disposed on one surface thereof, and a wireless power transmitting device disposed on another surface. The wireless power receiving device may be configured to receive power from another wireless power transmitting device, and the wireless power transmitting device may be configured to transmit power to another wireless power receiving device.

The plurality of display modules may include a plurality of first display modules and a plurality of second display modules, and may be coupled with each other in a matrix form.

The base module may include a plurality of transmitters, which may be arranged to respectively correspond to the plurality of first display modules.

The transmitter may be configured to transmit image signals by an electromagnetic wave method. Each of the plurality of display modules may include a plurality of light emitting devices, a waveguide configured to receive an electromagnetic wave at a first end thereof and to guide the received electromagnetic wave to a second end opposite to the first end, a receiver disposed on an outer surface of the waveguide and configured to sense the electromagnetic wave received through the waveguide, and to restore image signals from the sensed electromagnetic wave, and a controller configured to extract an image signal corresponding to the display module from the restored image signals, and to provide each of the plurality of light emitting devices with a driving signal for outputting an image corresponding to the extracted image signal.

The waveguide of the first display module may be configured to receive the electromagnetic wave transmitted from the transmitter at the first end thereof and to guide the received electromagnetic wave to the second end. The second end of the waveguide of the first display module may be configured to be connected to the first end of the waveguide of the second display module. The waveguide of the second display module may be configured to receive the electromagnetic wave transmitted from the second end of the waveguide of the first display module at the first end thereof.

The waveguide may include a protruding member disposed on the first end of the waveguide and configured to be inserted into the second end of the waveguide of another display module, and a door disposed on the second end of the waveguide, and configured to be selectively opened and closed, such that the door may be opened when the protruding member of another display module is inserted into the second end of the waveguide.

The waveguide may include a groove region disposed in the waveguide and having a shape corresponding to a shape of the door, and the door may be configured to couple to the groove region when the protruding member of another display module is inserted into the second end of the waveguide.

The waveguide may include a slider disposed in the other side of the waveguide and configured to move the door to the groove region when the protruding member of another display module is inserted into the second end of the waveguide. The protruding member may be configured to be separated into a plurality of pieces and coupled to the second end of the waveguide of another display module when inserted into the door of the another display module.

The base module may include a power supply device configured to supply power to each of the plurality of display modules. Each of the plurality of display modules may include a metal frame disposed on an outer wall of the waveguide. The first display module may be configured to receive power from the power supply device, and to supply at least a portion of the received power to the second display module through the metal frame.

In the display device according to the various embodiments of the present disclosure, the plurality of display modules may be coupled with each other to thus receive and further transmit the image signals to and from other display modules, thereby improving convenience in the manufacture, inspection, and repair of the display device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
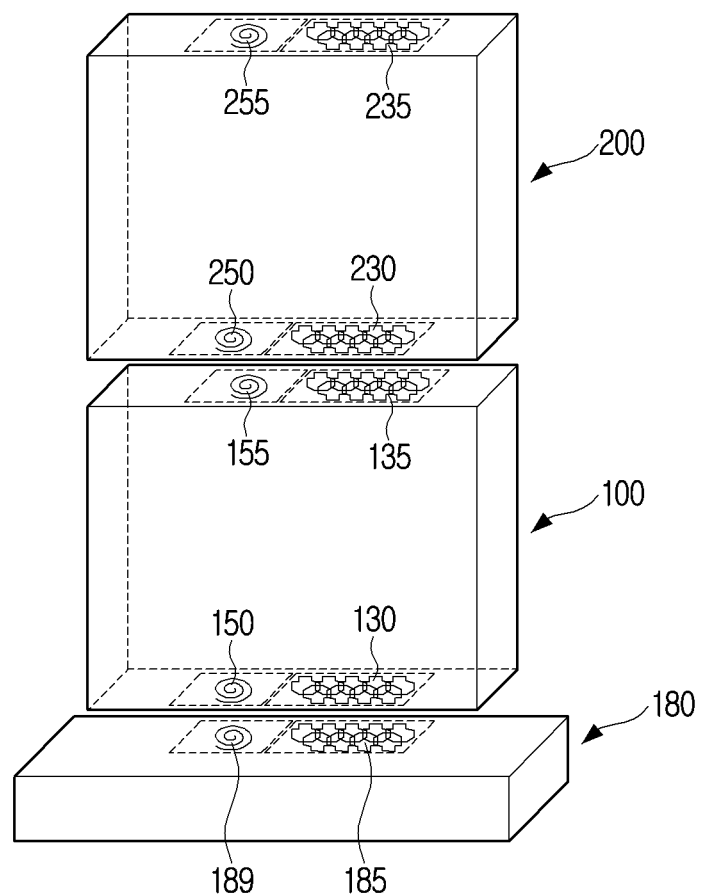
FIG. 1 is a perspective view illustrating a base module and a plurality of display modules according to an embodiment of the present disclosure.

Embodiments of the present disclosure are described with reference to the accompanying drawings to fully understand the configuration and effect of present disclosure. However, the present disclosure is not limited to the embodiments described below, and may be implemented in several forms and may be variously modified. Descriptions of the embodiments are provided only to make the present disclosure complete and allow those skilled in the art to which the present disclosure pertains to completely appreciate the scope of the present disclosure. In the accompanying drawings, a size of a component may be enlarged as compared with its actual size for convenience of explanation, and a ratio of each component may be exaggerated or reduced.

A term used in this specification and the claims is selected in consideration of its function in the present disclosure. However, this term may be changed based on intentions of those skilled in the art to which the present disclosure pertains, legal or technical interpretations, and emergences of new technology. In addition, some terms are arbitrarily selected by the applicant. This term may be interpreted to have the meaning defined in this specification, and if there is no specific definition of the term, it may be interpreted based on a general content of this specification and common technical knowledge in the art.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even when a process described as the subsequent operation is performed before a process described as the preceding operation, and the scope of the present disclosure should also be defined regardless of the sequences of the operations.

In this specification, an expression "have," "may have," "include," "may include," or the like, indicates the existence of a corresponding feature (for example, a numerical value, a function, an operation or a component such as a part), and does not exclude the existence of an additional feature.

Terms such as "first," "second," and the like, may be used to describe various components, and the components are not to be interpreted to be limited to the terms. These terms may be used to distinguish one component from another component. For example, a "first" component may be named a "second" component and the "second" component may also be similarly named the "first" component, without departing from the scope of the present disclosure.

In addition, terms such as "front end," "rear end," "upper surface," "lower surface," "side surface," "left side," "right side," "upper portion," "lower portion," "region," and the like, used in the present disclosure are defined based on the drawings. The shapes and positions of respective components are not limited to these terms.

In addition, this specification describes components necessary for describing each embodiment of the present disclosure, and is not necessarily limited thereto. Accordingly, some components may be changed or omitted, and other components may be added. In addition, the components may be distributed and arranged in different independent devices.

Furthermore, the embodiment of the present disclosure is described in detail with reference to the accompanying drawings and the contents shown in the accompanying drawings, and the present disclosure is not limited or restricted to the embodiments.

Hereinafter, the present disclosure is described in more detail with reference to FIGS. 1 through 12.

FIG. 1 is a perspective view illustrating a base module 180 and a plurality of display modules 100 and 200 according to an embodiment of the present disclosure.

Referring to FIG. 1, a display device 10 may include the base module 180 and the plurality of display modules 100 and 200.

The display device 10 may be an output device that expresses various colors while being operated in units of pixels or sub-pixels. For example, the display device 10 refers to any of various display devices such as a display device using a liquid crystal display panel, an organic light emitting diode panel, a plasma display panel, a light emitting diode panel, a micro light emitting diode (LED) panel, etc. A configuration of the display device may be divided into an output device outputting an image or the like, and a control device controlling the display device and supplying power, based on their functions.

The base module 180 may support the plurality of display modules 100 and 200. The base module 180 may serve to receive power, an image signal or the like from the outside and transmit the same to the plurality of display modules 100 and 200. The base module 180 may have any of various shapes and structures. The plurality of display modules 100 and 200 may be coupled with each other and the base module 180 may support the plurality of display modules 100 and 200.

As shown in FIG. 1, the base module 180 may have a shape of a supporter extending substantially parallel to the ground, and have a lower surface in contact with the ground or other substantially horizontal surface, and an upper surface on which the plurality of display modules 100 and 200 are coupled with each other to thereby support the plurality of display modules 100 and 200.

Alternatively, the base module 180 may have a shape of a supporter extending in a vertical direction substantially perpendicular to the ground, and have a lower surface or one side surface in contact with a floor or a wall surface and the other side surface on which the plurality of display modules 100 and 200 are coupled with each other to thus support the plurality of display modules 100 and 200.

The base module 180 may include a transmitter 185 transmitting the plurality of image signals respectively corresponding to the plurality of display modules 100 and 200.

The transmitter 185 may wirelessly transmit the image signal by including an antenna, and increase a signal transmission speed or may simultaneously transmit a plurality of channels by including the plurality of antennas in order to transmit data including the plurality of image signals necessary for driving the plurality of display modules 100 and 200. In particular, non-limiting specific structures and operations of the transmitter 185 including the plurality of antennas are described below with reference to the drawings in FIG. 3A to 3C.

The base module 180 may include a power supply device 189 supplying power to each of the plurality of display modules 100 and 200. The power supply device 189 may supply the plurality of display modules 100 and 200 with at least a portion of the power that the base module 180 receives from the outside through a power cable or the like.

The power supply device 189 may use various power supply methods. For example, a power receiver may be built in a coupling housing of the plurality of display modules 100 and 200, and the base module 180 or other display modules 100 and 200 may include a connector in their connection portion to thus supply power or transmit power to the plurality of display modules 100 and 200 by using a wireless power supply method.

The wireless power supply device 189 may supply power by including an antenna, and the number and size of antennas may depend on power to be supplied.

Therefore, according to an embodiment including the transmitter 185 and the wireless power supply device 189, each including the antenna, it is not necessary to individually connect a power and image supply cable and the connector with each other. It is thus possible to avoid damage to such a cable and connector, which may occur in the manufacturing process or usage of the display device 10, and also to avoid difficulty in replacing parts following the damage. It is also possible to easily replace the display module. In addition, a power specification or specification of the image signal, applied to the plurality of display modules 100 and 200, may be changed in the future, and it is possible to respond to this case by replacing the antennas of the transmitter 185 and wireless power supply device 189 without replacing the module.

The plurality of display modules 100 and 200 may include the first display module 100 and the second display module 200.

The first display module 100 may be coupled to the base module 180 to receive the plurality of image signals and to transmit the plurality of image signals to other display modules. The second display module 200 may be coupled to the first display module 100 to receive the image signals from the first display module 100. A specific structure of the plurality of display modules 100 and 200 is described below with reference to FIG. 2 and its subsequent drawings.

The plurality of display modules 100 and 200 may each be individually coupled to or separated from another display module 100 or 200 or the base module 180, and may have a modular structure for receiving the image signal and power.

By the illustrated embodiment, it is possible to omit a process of connecting or disconnecting the plurality of display modules 100 and 200 by means of a connector, and to thereby easily couple or separate the display modules.

Accordingly, it is possible to inspect and replace a given module by simply separating a portion of the plurality of display modules 100 and 200, rather than all of the display modules 100 and 200 and the base module 180, when it is necessary to check the plurality of display modules 100 and 200 or to replace the module due to its malfunction.

In addition, a new light emitting device may have improved performance in accordance with technological development. Installed light emitting devices may be replaced by the new light emitting devices by separating each display module 100 or 200, and the display device 10 may be converted to have improved performance. Accordingly, it is possible to minimize damage to the connector, a connection problem of the respective display modules 100 and 200, or the like, which may occur during a conversion and/or repair process of the display device.

In addition, in the manufacturing process of the display device 10, it is possible to manufacture a single standard display module regardless of a screen size of the display device 10, and stack the modules. Accordingly, in the display device 10 according to the present disclosure, the single standard display module may be combined to manufacture a variety of sizes of display device 10. Therefore, the manufacturing process in manufacturing the display device 10 of various sizes may be simplified, thus reducing a production cost.

Figure 2:
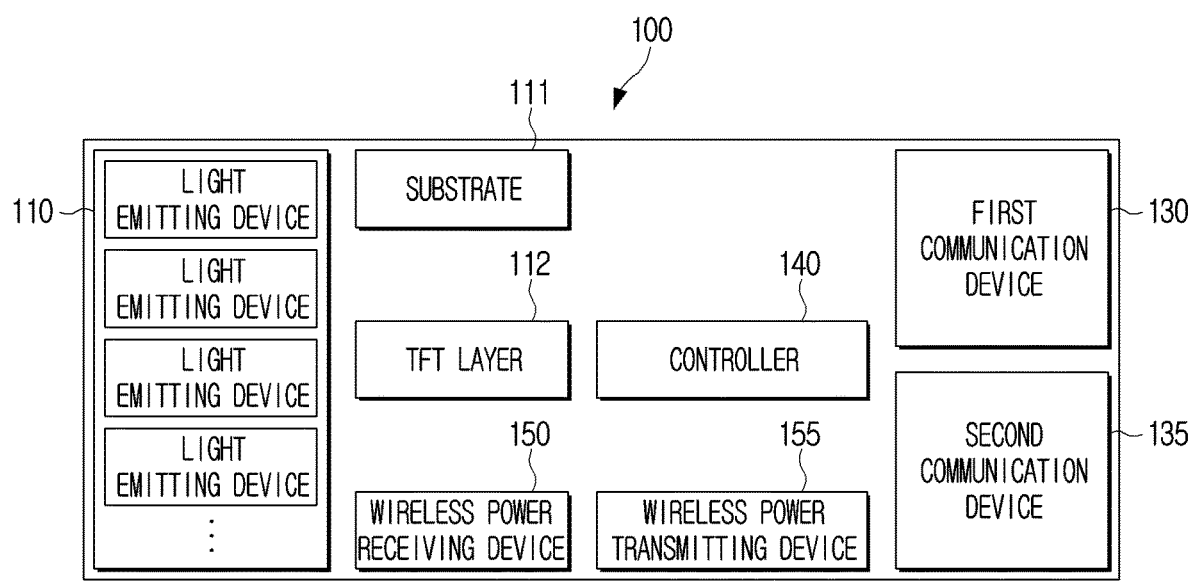
FIG. 2 is a block diagram schematically illustrating a display module according to an embodiment of the present disclosure.

FIG. 2 is a block diagram schematically showing the display module according to an embodiment of the present disclosure.

Referring to FIG. 2, each of the plurality of display modules 100 may include a plurality of light emitting devices 110, a substrate 111, a thin film transistor (TFT) layer 112, a first communication device 130, a second communication device 135, a controller 140, a wireless power receiving device 150, and a wireless power transmitting device 155.

The substrate 111 may be a transparent substrate such as a glass substrate or a quartz substrate, or may be a flexible substrate or a plastic substrate. The TFT layer 112 may be positioned on one surface of the substrate 111. The TFT layer 112 may control flow of a current provided to the plurality of light emitting devices 110.

A light emitting element of each light emitting device 110 may be a light emitting diode (LED) element, and may more specifically be a micro light emitting diode (μ-LED) or an organic light emitting diode (OLED).

For example, the light emitting element of each light emitting device 110 may be a μ-LED. In this case, each μ-LED may have a red color sub-pixel (or R sub-pixel), a green color sub-pixel (or G sub-pixel), and a blue color sub-pixel (or a B sub-pixel). One pixel may include three R, G, and B sub-pixels, and each TFT of the TFT layer 112 may be formed in units of sub-pixels.

Each pixel region may include a sub-pixel region and a pixel circuit region for driving each sub-pixel. The plurality of micro LEDs may be transferred to the pixel circuit region of the TFT layer 112, and electrode pads of each micro LED may respectively be electrically connected to electrode pads positioned in the TFT layer 112.

The plurality of light emitting devices 110 may have a structure in which the plurality of light emitting devices 110 described above are coupled with each other, and the light emitting device 110 is disposed toward the front of each display module 100.

The first communication device 130 may be disposed on one surface of the display module 100 to receive the image signal from another device, and the second communication device 135 may be disposed on the other surface of the display module 100, opposite to the one surface on which the first communication device 130 is disposed, to transmit the image signal to another device.

The first communication device 130 or the second communication device 135 may have a structure the same as or corresponding to that of the transmitter 185 of the base module 180. The first communication device 130, the second communication device 135, and the transmitter 185 may transmit and receive data signals required to drive individual components of the plurality of display modules 100 and 200 as well as the plurality of image signals.

The first communication device 130 of the first display module 100 may receive the plurality of image signals from the transmitter 185, and transmit the received plurality of image signals to a first communication device 230 of the second display module 200 through the second communication device 135.

The plurality of image signals may be transmitted from the transmitter 185 through the first communication device 130 and the second communication device 135 of the first display module 100 to the first communication device 230 and second communication device 235 of the second display module 200, and may also be transmitted to a third display module 300 to be coupled to the other surface of the second display module 200 and a plurality of display module devices subsequent thereto.

The base module 180 may transmit the plurality of image signals to the first display module 100 coupled to the base module 180 without being individually and directly connected to each of the plurality of display modules 100, 200 and 300, thereby reducing a size of the base module 180.

Output of the antenna of the transmitter 185 would normally be increased to reflect that a signal strength is decreased based on a separation distance, when the transmitter 185 directly transmits the image signal to the spaced display module 200. However, the plurality of display modules 100 and 200 each including the first communication device 130 and 230 and the second communication device 135 and 235 may stably transmit the image signal to the display module 200 spaced apart from the transmitter 185, thereby reducing output of the transmitter 185, and thus preventing signal instability, a signal interference, a power consumption problem, or the like.

The controller 140 may provide each of the plurality of light emitting devices 110 with a driving signal for outputting an image corresponding to the image signal received from the first communication device 130, and control the power, luminance, or the like of each of the plurality of light emitting devices 110.

The controller 140 may check the location of the current display module 100 by using various methods.

For example, the plurality of display modules 100 and 200 may include a position sensing device (not shown). In this case, the resistance value and current flow of the position sensing device (not shown) may be changed as the plurality of display modules 100 and 200 are coupled with each other, and through this change, the position sensing device (not shown) may sense the coupling state of the plurality of display modules 100 and 200 and the position of the current the display module and transmit the same to the controller 140. Alternatively, the position sensing unit (not shown) may include an optical module and an optical measurement sensor. In this case, the number of light emitting elements, the number of light emission, brightness, or the like of the optical module may be changed as the plurality of display modules 100 and 200 are stacked on each other, optical information transmitted from a lower part of the stack and optical information transmitted to an upper part thereof may thus be changed, and the position sensing device may thus determine the position of the current display module.

The controllers 140 and 240 may each determine the coupling state of the current display module and the position of the current display module based on the information received from the position sensing device (not shown), and the controllers 140 and 240 may each extract the necessary image signal based on the location of the current display module from the plurality of image signals transmitted from each of the first communication devices 130 and 230.

Therefore, the controller 140 may control the first communication device 130 and the second communication device 135 such that the same image signal as the image signal received through the first communication device 130 is transmitted through the second communication device 135. Alternatively, the controller 140 may extract an image signal corresponding to the current display module 100 from a plurality of image signals received through the first communication device 130, and control the remainder of the received plurality of image signals to be transmitted through the second communication device 135.

A method of distinguishably transmitting a signal corresponding to the display module 100, in a process of transmitting the image signals corresponding to the plurality of display modules 100 and 200 by the transmitter 185 or the second communication device 135, will be further described below in detail with reference to FIGS. 3A to 3C.

Each of the plurality of display modules 100 and 200 may receive power by including a configuration corresponding to a power supply method of the base module 180, i.e., by including a power receiving device and a power transmitting device.

For example, the plurality of display modules 100 and 200 may correspond to the wireless power supply device 189 of the base module 180 by including the wireless power receiving devices 150 and 250 and the wireless power transmitting devices 155 and 255.

The wireless power receiving device 150 may be disposed on one surface of the display module 100 to receive power from another device, and the wireless power transmitting device 155 may be disposed on the other surface opposite to the one surface on which the wireless power receiving device 150 is disposed, and may transmit power to another device.

The wireless power receiving device 150 may receive power from the wireless power supply device 189, and supply power to the individual components of the display module 100 such as the plurality of light emitting devices 110, the first communication device 130, the second communication device 135, and the controller 140.

When using the wireless power supply method, as described above, in the plurality of display modules 100 and 200, the power supply cable and the connector do not need to be individually connected with each other. It is thus possible to avoid the damage to the cable or the connector, which may occur in the manufacturing process or usage of the display device 10, and also to avoid difficulty in replacing parts following this damage.

Figure 3A:
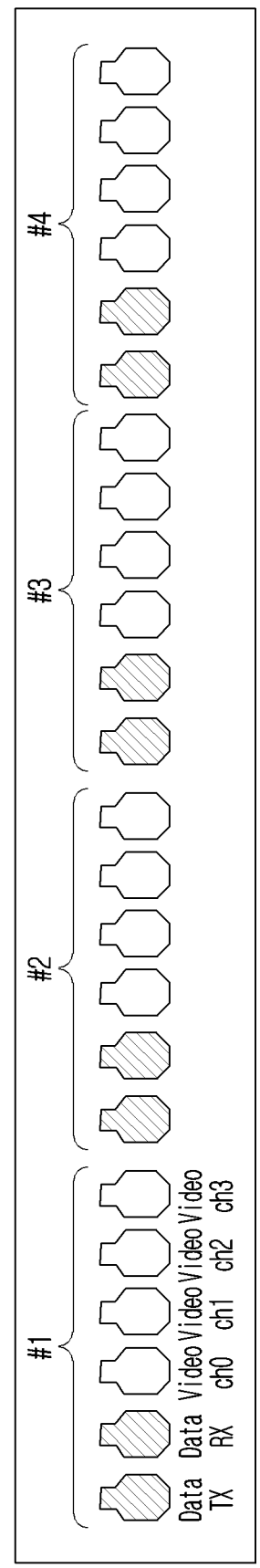
FIGS. 3A to 3C are views each illustrating various arrangement structures of the transmitter according to embodiments of the present disclosure.
Figure 3B:
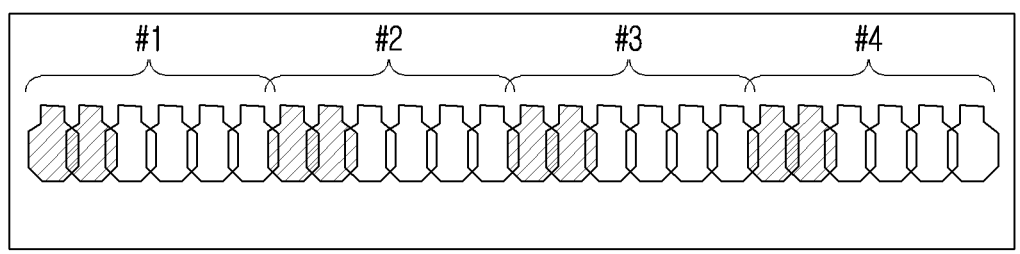
Figure 3C:
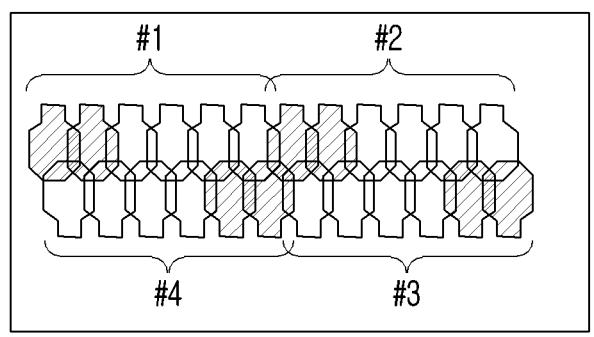

FIGS. 3A to 3C are views each illustrating various arrangement structures of the transmitter 185 according to an embodiment of the present disclosure.

Referring to FIG. 3A to 3C, the transmitter 185 may include a plurality of antennas, and the plurality of antennas may transmit the image signals different from each other. In addition, the first communication device 130 and the second communication device 135 may each include the plurality of antennas like the transmitter 185.

Each of the controllers 140 and 240 of the plurality of display modules 100 and 200 needs to extract the image signal corresponding to the corresponding display module and provide the same to the corresponding light emitting device 110, and arrangement structures of the plurality of antennas respectively transmitting the plurality of image signals are therefore described herein.

The antenna of the transmitter 185 may include a transmitter (or a data transmitter (Data TX)) that transmits data on power and luminance of the plurality of light emitting devices 110, an operation of the controller 140, or the like, and a receiver (or a data receiver (Data RX) that receives the data, and an antenna that transmits the image signal (Video ch. #) of each channel to configure one antenna set, and include the plurality of antenna sets whose number corresponds to the number of display modules stacked thereon.

The transmitter 185 shown in FIG. 3A shows a structure in which a total of twenty antennas are arranged in a line, including a set of four antennas, as an embodiment of a situation in which a total of four display modules 100, 200, 300, and 400 are stacked on top of the base module 180.

However, the base module 180 may have a limited length, and there is a limit in arranging the antennas in a line in a left-right direction thereof as the number of display modules stacked on top of the base module 180 is increased.

As shown in FIG. 3B, the transmitter 185 may have a structure in which the respective antennas are continued in the left-right direction, and at least some of the antennas are overlapped with adjacent antennas. Alternatively, as shown in FIG. 3C, the transmitter 185 may have a structure in which the respective antennas are continued in the left-right direction and the vertical direction, and at least some of the antennas are overlapped with the adjacent antennas. Therefore, the transmitter 185 may effectively reduce its length in the left-right direction through the overlapping arrangement structure of the plurality of antennas. However, interference may occur between the overlapping antennas of the transmitter 185, thus requiring control of the transmission.

Figure 4A:
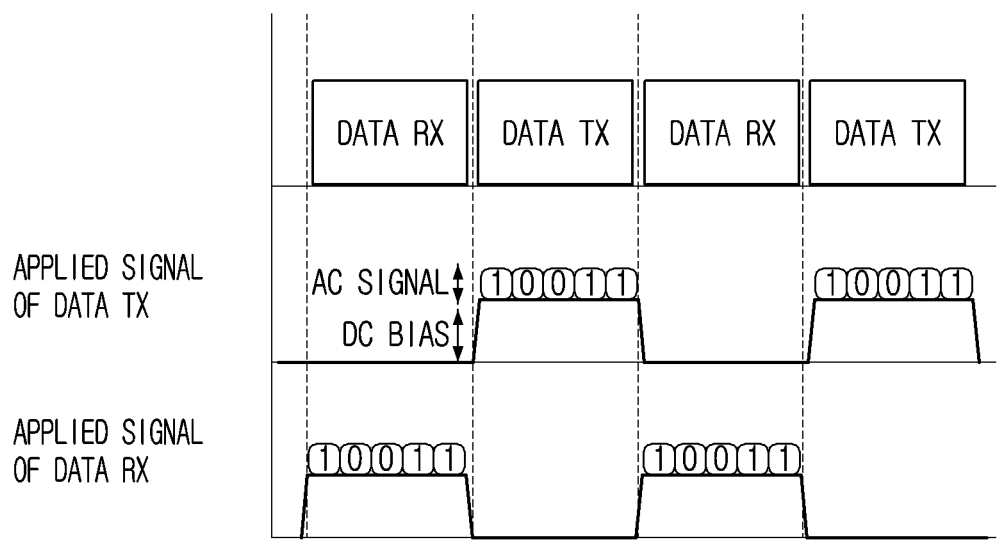
FIGS. 4A to 4C are views each illustrating an example transmission of an individual antenna of the transmitter according to an embodiment of the present disclosure.
Figure 4B:
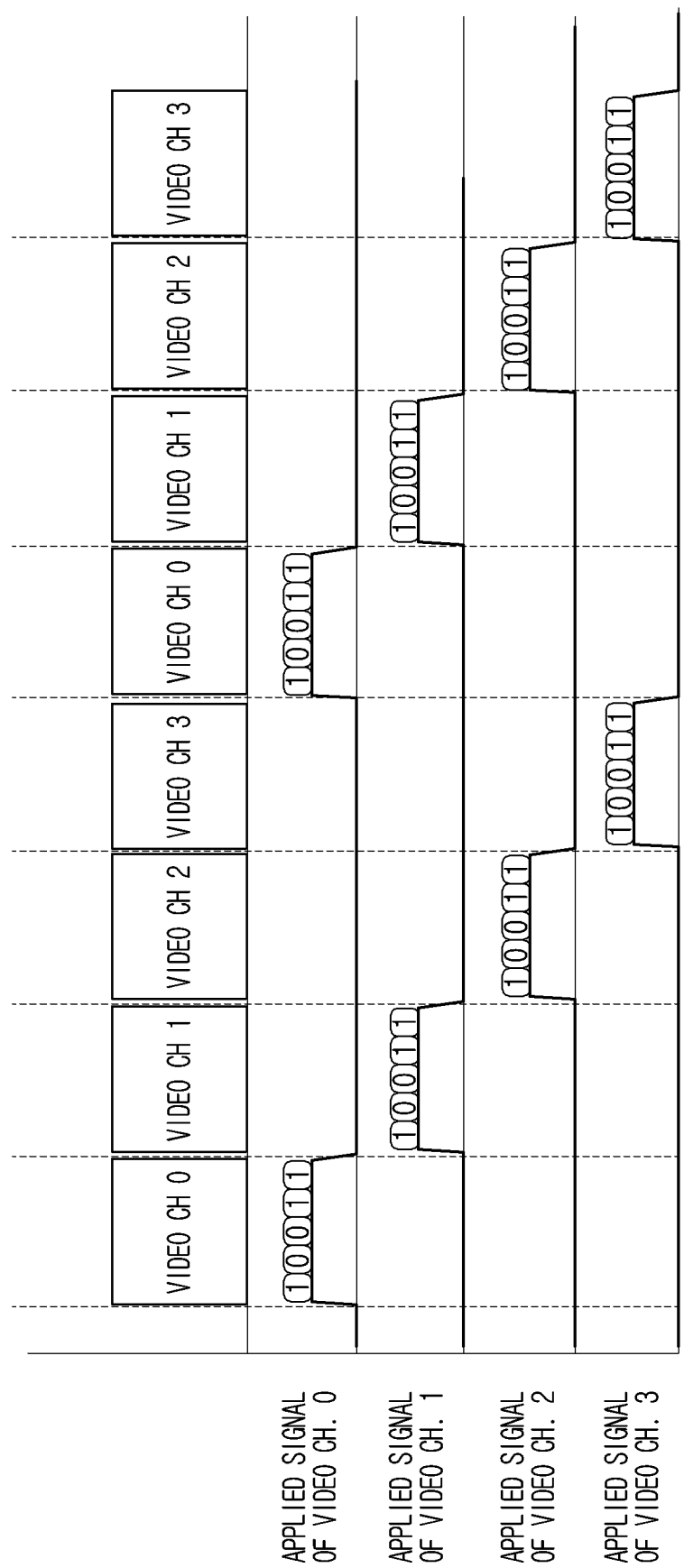
Figure 4C:
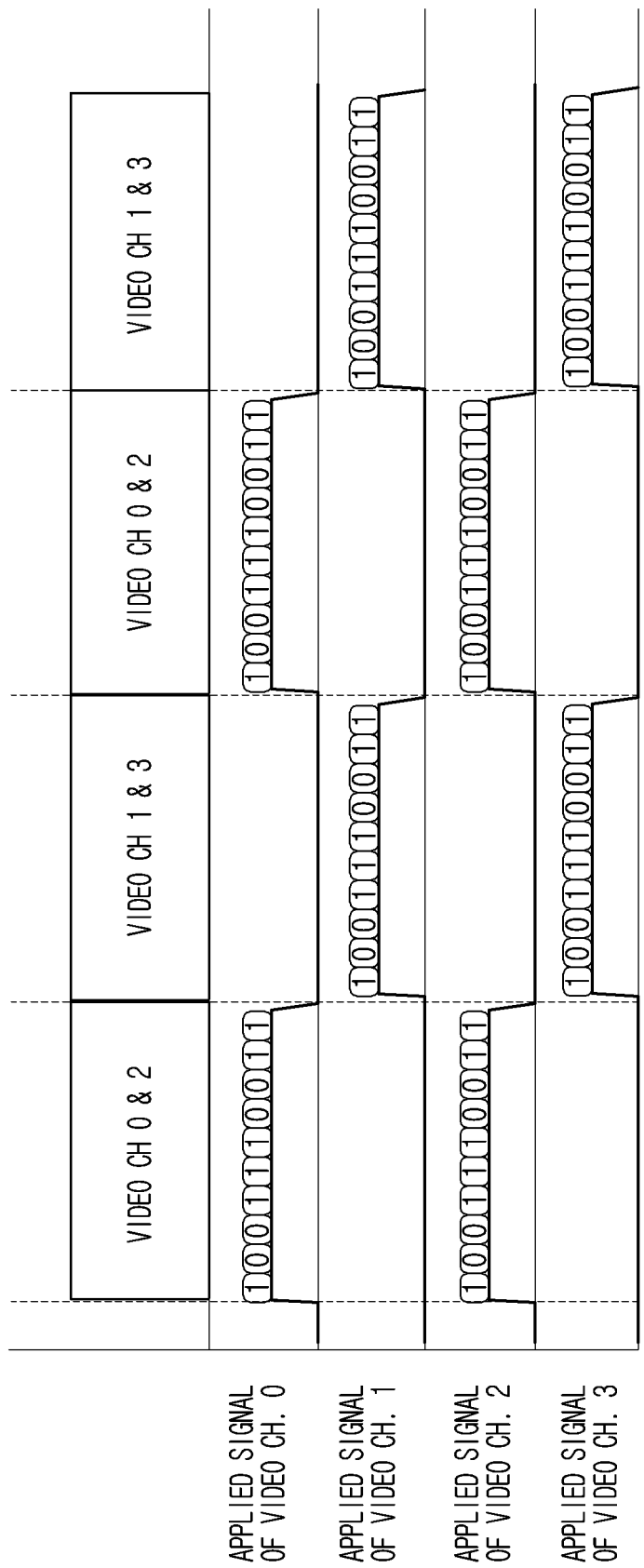

FIGS. 4A to 4C are views each illustrating an example transmission of an individual antenna of the transmitter 185 according to an embodiment of the present disclosure.

Referring to FIGS. 4A to 4C, provision of the image signal through an individual antenna may reduce the interference with that of an adjacent overlapping antenna by controlling a transmission interval by superimposing a direct current (DC) bias voltage and an alternating current (AC) signal.

The plurality of antennas disposed adjacent to each other may have different phases of the alternating current (AC) signals respectively applied thereto, and only a desired antenna may be activated at a corresponding time based on an applied DC voltage value. In addition, the signal transmitted here may correspond to the AC signal, and the plurality of display modules 100 and 200 may thus communicate with the base module 180 and other display modules 100 and 200 as well.

As shown in FIG. 4A, the transmitter (or the Data TX) that transmits the data and the receiver (or the Data RX) that receives the data among the antennas may be partially overlapped with each other. In this case, the Data TX and the Data RX may be applied by superimposing the alternating current (AC) signals of opposite phases to each other, and the direct current (DC) bias voltage may thus be alternately transmitted over time, thereby preventing mutual interference occurring therebetween.

As shown in FIG. 4B, this configuration may also be applied to the antennas of the image signal. The respective image signal antennas may also be applied by superimposing the direct current (DC) bias voltage and the alternating current (AC) signal, changing the phases of the alternating current (AC) signals, respectively applied thereto, and thus controlling the direct current (DC) bias voltage to be applied at different times over time, thereby transmitting the image signals to minimize the mutual interference therebetween.

As shown in FIG. 4C, at least two or more image signal data may be transmitted simultaneously when there are many image signals to be applied. In this case, the antennas (Video 0 and Video 2 or Video 1 and Video 3) simultaneously applying the DC voltage and the AC signals may be arranged not to be adjacent to each other, to reduce interference therebetween.

In the radiation performance and radiation frequency of the antenna, each of the plurality of antennas may include a circuit element such as a diode or a transistor, which may be controlled by a DC power supply. In this way, it is possible to change an electrical path of the antenna to thus change the impedance, thereby changing the radiation performance and radiation frequency of the antenna.

Figure 5:
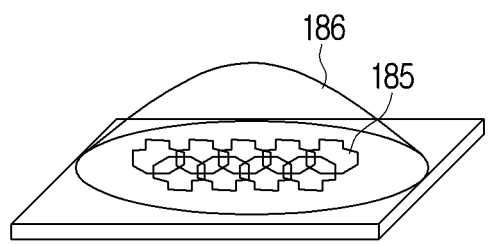
FIG. 5 is a perspective view illustrating a dome-shaped cap according to an embodiment of the present disclosure.

FIG. 5 is a perspective view illustrating a dome-shaped cap 186 according to an embodiment of the present disclosure.

Referring to FIG. 5, the dome-shaped cap 186 may be applied over the transmitter 185 or the second communication device 135.

Energy of a wireless signal may be decreased based on a distance. Therefore, the wireless signal is preferably transmitted to the upper part whiling minimizing its loss to reduce loss of power consumed in transmitting the image signal and simultaneously minimize the interference with other display modules.

The dome-shaped cap 186 may have a dome shape and cover the transmitter 185 or the second communication device 135 to collect emitted electromagnetic waves above the dome and spread the same.

The dome-shaped cap 186 may be applied over the entire transmitter 185 at once, or individually applied over each of the plurality of antennas included in the transmitter 185.

Figure 6:
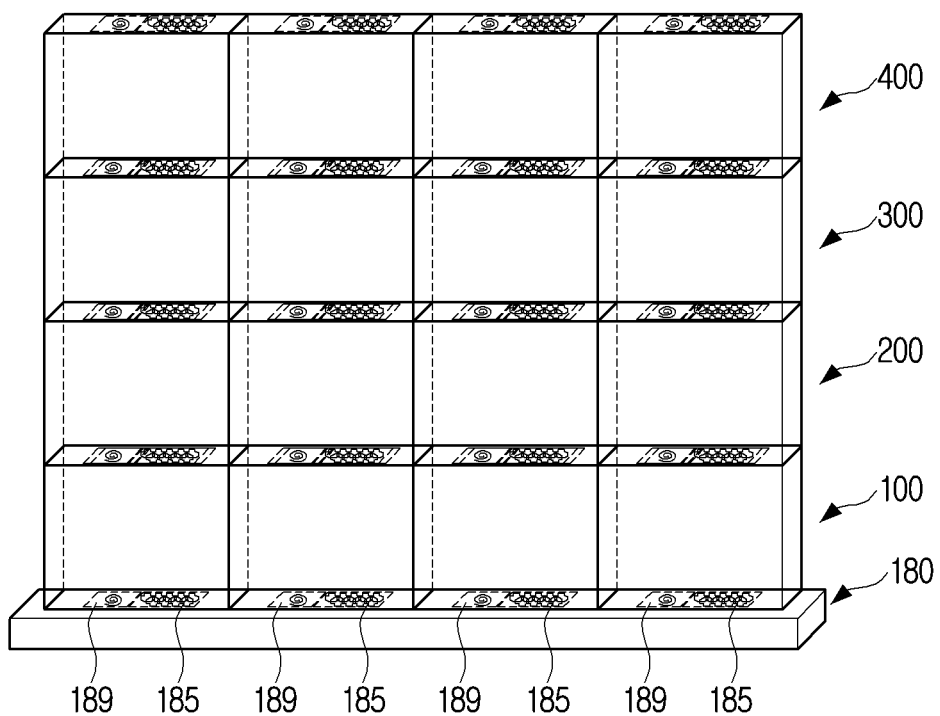
FIG. 6 is a perspective view illustrating a display device according to an embodiment of the present disclosure.

FIG. 6 is a perspective view illustrating the display device 10 according to an embodiment of the present disclosure.

Referring to FIG. 6, the plurality of display modules 100, 200, 300 and 400 respectively includes the plurality of first display modules to fourth display modules 100, 200, 300 and 400, and the plurality of display modules 100, 200, 300, 400 may be coupled with each other in a matrix form.

The plurality of display modules 100, 200, 300, 400 may be continuously connected with each other and disposed in the vertical direction or the left-right direction, stacked in the matrix form. Although not shown in the drawings, the first communication device 130 and the second communication device 135 may be disposed on different surfaces, and the plurality of display modules 100, 200, 300 and 400 may respectively be arranged by being freely connected with other display modules 100, 200, 300 and 400 in the vertical direction or the left-right direction.

The base module 180 in the matrix form may include a plurality of transmitters 185, and the plurality of transmitters 185 may respectively be arranged to correspond to the plurality of first display modules 100. In this case, the plurality of display modules 100, 200, 300, and 400 stacked on the base module 180 and arranged in the same column may receive the image signals from the respective transmitters 185 corresponding thereto, and likewise, the plurality of display modules 100, 200, 300, 400 may receive wireless power from the wireless power supply devices 189 disposed to respectively correspond to the plurality of first display modules 100.

In this way, the plurality of display modules 100, 200, 300, and 400 may be assembled with each other in a modular form and wirelessly receive the image signals and power. Therefore, supply of the image and power may be maintained even in an operation of arranging the light emitting devices 110 of the adjacent display modules 100, 200, 300, and 400, and the display device 10 may thus be operated.

Figure 7:
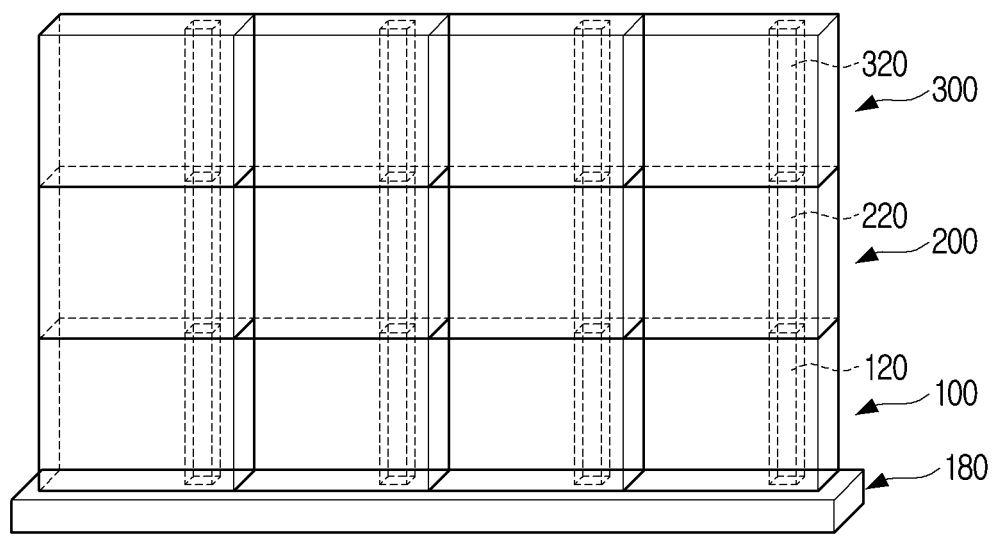
FIG. 7 is a perspective view illustrating a display device according to another embodiment of the present disclosure.

FIG. 7 is a perspective view illustrating the display device 10 according to another embodiment of the present disclosure.

Referring to FIG. 7, as an alternative to the antennas described with respect to other illustrated embodiments, the transmitter 185 may transmit the image signal by using an electromagnetic wave method, and the plurality of display modules 100, 200, and 300 may respectively include waveguides 120, 220, and 320.

The waveguides 120, 220, and 320 may each receive the electromagnetic wave at a first end thereof and guide the received electromagnetic wave to a second, opposite end. The waveguides 120, 220, and 320 may each guide the electromagnetic wave to a target point while minimizing energy loss that may occur while the electromagnetic wave transmitted from the transmitter 185 is transmitted to the plurality of display modules 100, 200, and 300.

A wave including the electromagnetic wave may spread in a three-dimensional space, and its amplitude may be decreased by the square of a distance. However, when the waveguides 120, 220, and 320 are used, it is possible to guide the wave by limiting its spread to one or two dimensions, thereby reducing the energy loss.

In general, the waveguide 120 may refer to a metal tube made of a single metal material, and an inner path of the waveguide 120 may have a smooth and flat surface to minimize the scattering and dispersion of the electromagnetic wave in a process of guiding the electromagnetic wave.

The second end of each of the waveguides 120, 220, and 320 of the plurality of display modules 100, 200, and 300 may be connected to the first end of each of the waveguides 120, 220, and 320 of the other display modules 100, 200, and 300.

The waveguide 120 of the first display module 100 coupled to the base module 180 among the plurality of display modules 100, 200, and 300 may receive the electromagnetic wave that is transmitted from the transmitter 185 of the base module 180 at the first end thereof to guide the same to the second end. In addition, each of the waveguides 220 and 320 of the plurality of display modules 200 and 300 coupled to other display modules may receive the electromagnetic wave that is guided from the second end of the waveguide 120 of the first display module 100 at the first end thereof and guide back the same to the second end.

The output of the transmitter 185 would normally be increased to reflect that the energy is rapidly decreased based on a separation distance, when the electromagnetic waves are transmitted to the plurality of display modules 100, 200, and 300, spaced apart from the base module 180 without including the waveguide 120. Further, a separate electromagnetic-wave blocking path would normally be prepared because the electromagnetic waves may be transmitted to non-target display modules positioned on the left and right sides or the controller 140 of each display module may need to extract and convert only a necessary electromagnetic wave among the plurality of electromagnetic wave signals having the interference occurring therebetween.

However, the display device 10 according to an embodiment of the present disclosure may use the waveguides 120, 220, and 320 to thus minimize the energy loss from the transmitter 185 to the display modules 200 and 300 located at a relatively long distance, and transmit the electromagnetic wave without causing interference to other display modules 100, 200, and 300 in the left-right direction. It may thus reduce power consumption of the display device 10, and precisely control each of the plurality of display modules 100, 200, and 300.

Figure 8:
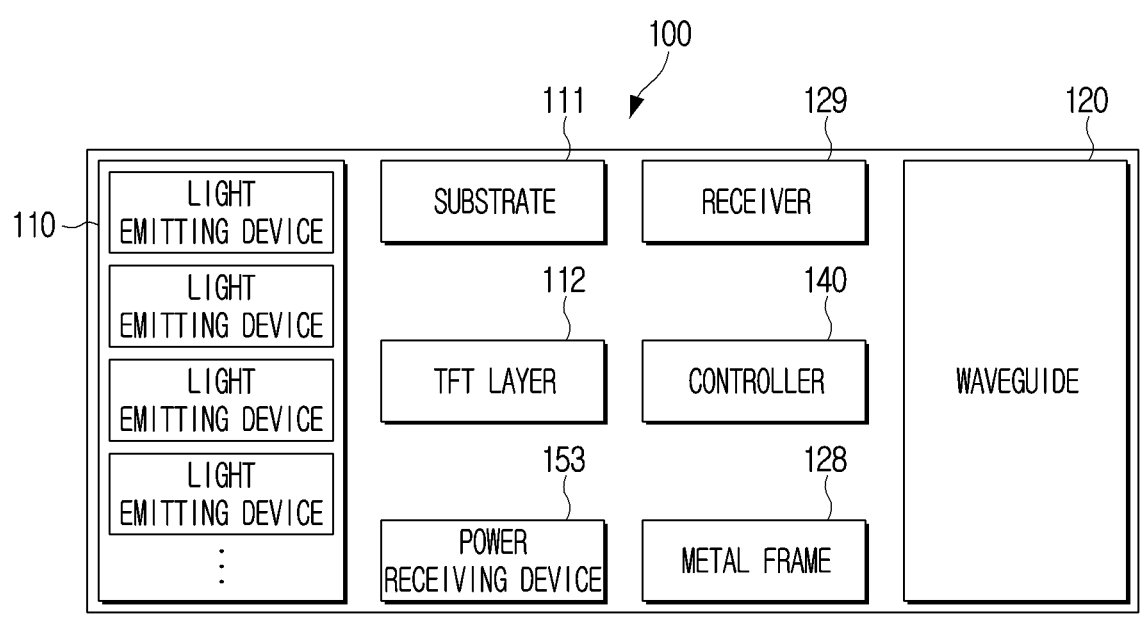
FIG. 8 is a block diagram schematically illustrating a display module according to another embodiment of the present disclosure.

FIG. 8 is a block diagram schematically illustrating the display module 100 according to another embodiment of the present disclosure.

Referring to FIG. 8, each of the plurality of display modules 100 may include the plurality of light emitting devices 110, the substrate 111, the TFT layer 112, the waveguide 120, a metal frame 128, a receiver 129, the controller 140, and a power receiving device 153.

The receiver 129 may be disposed on an outer surface of the waveguide 120, sensing the electromagnetic wave transmitted through the waveguide 120, and restoring the image signal from the sensed electromagnetic wave. The receiver 129 may transmit the restored image signal to the controller 140.

The receiver 129 may include a sensing device receiving the electromagnetic waves, and the sensing device may be disposed in the waveguide 120. Alternatively, the sensing device may be disposed adjacent to a slit 124 in an embodiment in which the slit 124 is positioned in the waveguide 120, as will be illustrated further herein.

The controller 140 may extract the image signal corresponding to the current display module 100 from the restored image signals, and provide each of the plurality of light emitting devices 110 with the driving signal for outputting an image corresponding to the extracted image signal.

The power receiving device 153 may receive power from a power supply device 188 of the base module 180, and may supply power to the components of the display module such as the plurality of light emitting devices 110, the receiver 129, and the controller 140. In the illustrated embodiment, the power receiving device 153 and the power supply device 188 are not wireless, unlike the wireless power receiving device 150 and wireless power supply device 189 of previous embodiments, and their operation will be described further herein.

Figure 9:
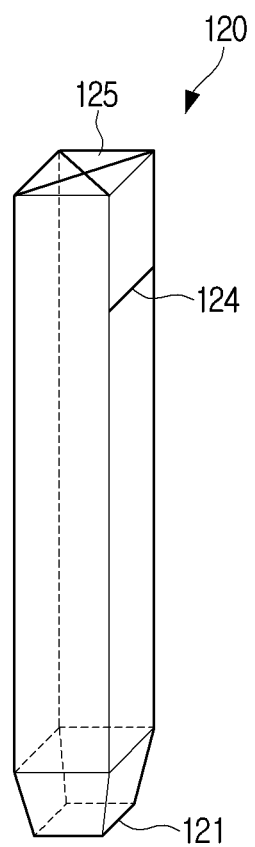
FIG. 9 is a perspective view illustrating a waveguide according to an embodiment of the present disclosure.

FIG. 9 is a perspective view illustrating a waveguide according to an embodiment of the present disclosure.

Referring to FIG. 9, the waveguide 120 may include a protruding member 121, the slit 124, and a door 125. Each component of the waveguide 120 may also be termed a component of the display module 100 in which the waveguide 120 is disposed.

The waveguide 120 may have a rectangular cross-section, may extend upward, and may have a smooth and flat inner surface. The protruding member 121 may be disposed on the first end of the waveguide 120 that receives the electromagnetic wave, and may be configured to be inserted into the second end of a waveguide of another display module 200. The door 125 may be disposed on the second end of the waveguide 120 through which the electromagnetic wave is transmitted, and may be configured to be selectively opened and closed.

The protruding member 121 may be formed integrally with the waveguide 120, and may have a cross-sectional area which becomes smaller as it extends from the first end of the waveguide 120.

The slit 124 may be positioned in the outer surface of the waveguide 120 of the display module 100 and communicate between the outside and inside of the waveguide 120. The slit 124 may be a narrow gap through which a wave such as the electromagnetic wave passes, and may have a finely thin width.

The electromagnetic wave transmitted from the transmitter 185 of the base module 180 may pass through the slit 124, be sensed by the sensing device of the receiver 129 in the display module 100, and be converted into an electric signal, and the electrical signal may be transmitted from the transmitter 185 of the base module 180 to the display module 100.

The door 125 may be disposed at an end of the waveguide 120, folded inward from the waveguide 120, and may be opened when the protruding member 221 of another display module 200 is inserted thereinto and closed when the protruding member is separated therefrom.

A door of the display module, disposed on the uppermost layer, on which no display module is stacked, that is, like the third display module 300 in the matrix structure shown in FIG. 7, may remain closed to prevent the electromagnetic wave of the waveguide 320 from being emitted to the outside.

Figure 10A:
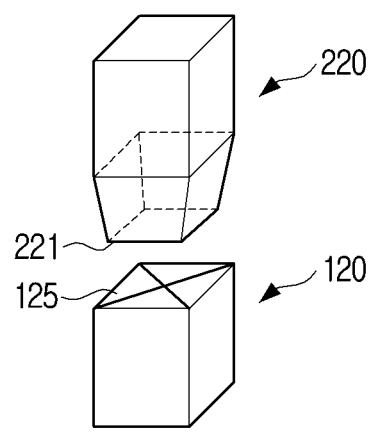
FIGS. 10A and 10B are perspective views each illustrating a stage of a coupling process of waveguides according to an embodiment of the present disclosure.
Figure 10B:
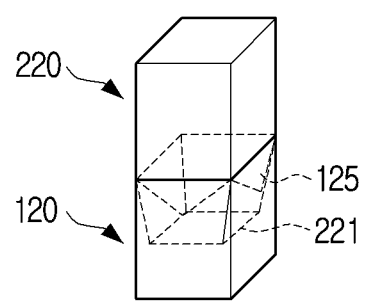

FIGS. 10A and 10B are perspective views each illustrating a stage of a coupling process of the waveguides according to an embodiment of the present disclosure.

Referring to FIGS. 10A and 10B, a protruding member 221 of the waveguide 220 of the second display module 200 may be moved into contact with the door 125 of the waveguide 120 of the first display module 100.

The protruding member 221 of the waveguide 220 of the second display module 200 may push the door 125 of the waveguide 120 of the first display module 100, and the top (or second end) of the waveguide 120 of the first display module 100 and the bottom (or first end) of the waveguide 220 of the second display module 200 may thus be connected with each other. Accordingly, the waveguide 220 of the second display module 200 may receive the electromagnetic wave from the transmitter 185 of the base module 180 while being spaced apart from the base module 180 even without being coupled to the base module 180.

The protruding member 221 of the second display module 200 may be drawn into the door 125 of the first display module 100, and the outsides of the waveguides 120 and 220 may be connected with each other while having the smooth and flat surface even after the connection.

Figure 11A:
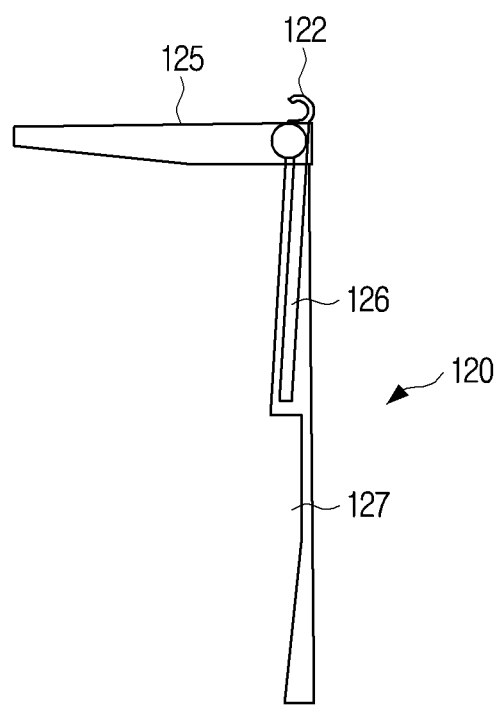
FIGS. 11A to 11C are cross-sectional views of partial regions of a waveguide, illustrating components enabling a coupling process of the waveguide according to an embodiment of the present disclosure.
Figure 11B:
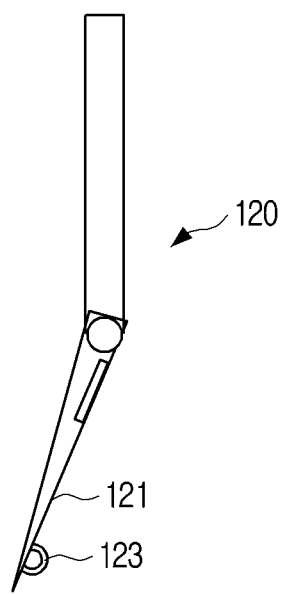
Figure 11C:
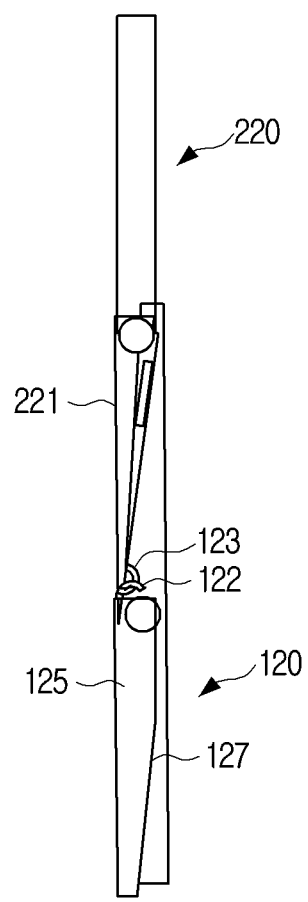

FIGS. 11A to 11C are cross-sectional views of partial regions of the waveguide 120, illustrating components enabling a coupling process of the waveguide 120 according to an embodiment of the present disclosure.

Referring to FIGS. 11A to 11C, the waveguide 120 may include a first pin 122, a second pin 123, a slider 126, and a groove region 127.

The first pin 122 may be disposed at the door at the second end of the waveguide 120, the second pin 123 may be disposed near the protruding member 121 disposed at the first end of the waveguide 120, and the first pin 122 may be coupled with the second pin 223 of another waveguide 220.

The slider 126 may move the door 125 downward when the protruding member 221 of the second display module 200 is inserted into the door. In detail, the second pin 223 of the second display module 200 and the first pin 122 of the first display module 100 may be connected with each other, the protruding member 221 may thus push and move the door 125 in a direction in which the slider 126 is deployed, and the door 125 may thus be coupled to the groove region 127 positioned below the slider 126.

The groove region 127 may be disposed in the waveguide 120 and have a shape corresponding to a shape of the door 125. Therefore, the door 125 of the waveguide 120 of the first display module 100 may be coupled to the groove region 127 and disposed within the waveguide 120 when the protruding member 221 of the waveguide 220 of the second display module 200 is inserted thereinto.

The groove region 127 may have the shape corresponding to the shape of the door 125, and the inside of the first side of the waveguide 120 may have a smooth and flat surface as the door 125 is coupled to the groove region 127.

The protruding member 221 may be separated into a plurality of pieces. For example, the protruding member 221 may have a quadrangular cross section, and in this case, the protruding member 221 may be separated into four pieces based on an edge of the protruding member 121. The protruding member 221 of the second display module 200 may be inserted into the door 125 of the first display module 100, and in this case, the protruding member 221 may be separated into the plurality of pieces, and coupled to the inside of the waveguide 120 of the first display module 100.

Therefore, at a connection portion formed between the waveguides 120 and 220 when the waveguide 120 of the first display module 100 and the waveguide 220 of the second display module 200 are connected with each other, the door 125 may be disposed in the groove region 127, and the protruding member 121 may be separated into the pieces and coupled to the inner surface of the waveguide 120, and the inside of the connection portion of the waveguide 120 may thus have the smooth and flat surface. Accordingly, the electromagnetic wave may be guided along the flat inner surface even at the connection portion in the waveguide 120.

Figure 12:
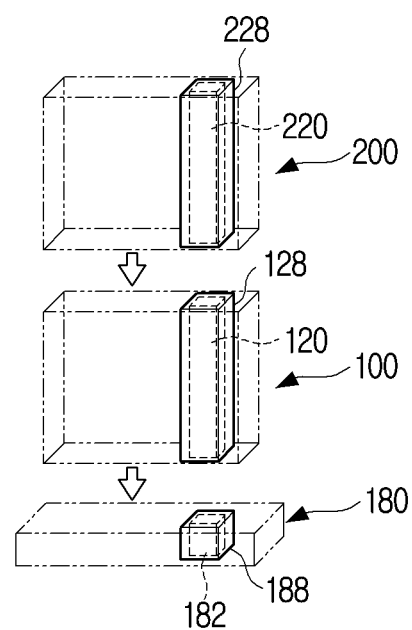
FIG. 12 is a perspective view illustrating assembly of a display device according to an embodiment of the present disclosure.

FIG. 12 is a perspective view illustrating assembly of the display device 10 according to an embodiment of the present disclosure.

Referring to FIG. 12, the base module 180 may include a coupling member 182, and the display modules 100 and 200 may respectively include metal frames 128 and 228. In this embodiment, an insulating member may be positioned between outer walls of the waveguide 120, or the outer wall of the waveguide 120 may be insulation-coated. The waveguide 120 of the first display module 100 may be coupled to the coupling member 182. The coupling member 182 may be coupled to the transmitter 185, or may include the transmitter 185 within its structure.

The coupling member 182 may be made of the same material as that of the waveguide 120, and may have the same structure as that of the door 125 of the waveguide 120.

The coupling member 182 may have a structure corresponding to that of the protruding member 121 of the first display module 100, and the protruding member 121 may thus be inserted and coupled thereto.

The waveguide 120 of the first display module 100, the waveguide 220 of the second display module 200, and the waveguide 320 of the third display module 300 may be connected with each other on the top of the coupling member 182 in a straight line, and the electromagnetic wave transmitted starting from the coupling member 182 may be transmitted to the third display module 300 while minimizing its energy loss.

As described previously, in certain embodiments, a non-wireless power receiving device 153 may be provided. The metal frames 128 and 228 may respectively be disposed on the outer walls of the waveguides 120 and 220, and may receive power from a non-wireless power supply device 188 of the base module 180 or another metal frame 128 and transmit the same to other devices. That is, the non-wireless power receiving device 153 of the first display module 100 may receive power from the non-wireless power supply device 188, the first display module 100 may supply at least a part of the received power to the another display module 200 through the metal frame 128, and the non-wireless power receiving device 253 of the second display module 200 may receive power from the metal frame 128 of the first display module 100.

The metal frame 128 may be formed of a single conductor to receive power from the base module 180, and a ground part may be positioned in each of the plurality of display modules 100 and 200. Alternatively, the metal frame 128 may be made of a plurality of materials for the current to flow in both directions. The metal frame 128 may receive power by being connected to the power supply device 188 disposed on the outer wall of the coupling member 182 of the base module 180.

Accordingly, the display device 10 according to an embodiment of the present disclosure may provide power to the display modules 200 and 300, spaced apart from the base module 180, without individually connecting the power connectors to the plurality of display modules 100 and 200. In addition, the metal frame 128 may be connected together when the waveguide 120 is connected between the plurality of display modules 100 and 200, and the plurality of display modules 100 and 200 may thus be easily coupled with or separated from each other.

Although the various embodiments of the present disclosure have been individually described hereinabove, each embodiment is not necessarily implemented alone, and may also be implemented so that the configurations and operations thereof are combined with those of one or more other embodiments.

In addition, although the embodiments of the present disclosure are shown and described hereinabove, the present disclosure is not limited to the above-mentioned specific embodiments, and may be variously modified by those skilled in the art to which the present disclosure pertains without departing from the gist of the present disclosure as disclosed in the accompanying claims. These modifications should also be understood to fall within the scope and spirit of the present disclosure.

What is claimed is:

1. A display device comprising:
   a plurality of display modules; and
   a base module comprising a transmitter configured to transmit a plurality of image signals respectively corresponding to each of the plurality of display modules,
   wherein the plurality of display modules includes:
   a first display module coupled to the base module to receive the plurality of image signals and to transmit at least a subset of the plurality of image signals to additional display modules of the plurality of display modules; and
   a second display module coupled to the first display module to receive the subset of the plurality of image signals from the first display module,
   wherein the transmitter includes a plurality of antennas each configured to transmit a respective one of the plurality of image signals.

2. The display device as claimed in claim 1, wherein each of the plurality of display modules comprises:

a plurality of light emitting devices;
a first communication device disposed on one surface thereof and configured to receive image signals from another display module of the plurality of display modules;
a second communication device disposed on another surface opposite to the one surface and configured to transmit image signals to another display module of the plurality of display modules; and
a controller configured to extract an image signal corresponding to the display module from the image signals received through the first communication device, and to provide each of the plurality of light emitting devices with a driving signal for outputting an image corresponding to the extracted image signal.

3. The display device as claimed in claim 1, wherein each image signal is provided through the plurality of antennas by superimposing a direct current (DC) bias voltage and an alternating current (AC) signal.

4. The display device as claimed in claim 3, wherein at least a subset of the plurality of antennas are disposed adjacent to each other, and
the subset of the plurality of antennas disposed adjacent to each other have different respective phases of AC signals applied thereto.

5. A display device comprising:
a plurality of display modules; and
a base module comprising a transmitter configured to transmit a plurality of image signals respectively corresponding to each of the plurality of display modules,
wherein the plurality of display modules includes:
a first display module coupled to the base module to receive the plurality of image signals and to transmit at least a subset of the plurality of image signals to additional display modules of the plurality of display modules; and
a second display module coupled to the first display module to receive the subset of the plurality of image signals from the first display module,
wherein the base module includes a power transmitting device configured to supply power to each of the plurality of display modules, and
the first display module is configured to receive power from the power transmitting device and configured to supply at least a portion of the received power to the second display module,
wherein the power transmitting device is a wireless power transmitting device transmitting power wirelessly,
wherein each of the plurality of display modules comprises:
a wireless power receiving device disposed on one surface thereof, and
a wireless power transmitting device disposed on another surface opposite to the one surface, and
wherein the wireless power receiving device is configured to receive power from another wireless power transmitting device, and the wireless power transmitting device is configured to transmit power to another wireless power receiving device.

6. The display device as claimed in claim 1, wherein the plurality of display modules comprises a plurality of first display modules and a plurality of second display modules, and
wherein the plurality of display modules are coupled with each other in a matrix form.

7. The display device as claimed in claim 6, wherein the base module comprises a plurality of transmitters, and the plurality of transmitters are arranged to respectively correspond to the plurality of first display modules.

8. A display device comprising:
a plurality of display modules; and
a base module comprising a transmitter configured to transmit a plurality of image signals respectively corresponding to each of the plurality of display modules,
wherein the plurality of display modules includes:
a first display module coupled to the base module to receive the plurality of image signals and to transmit at least a subset of the plurality of image signals to additional display modules of the plurality of display modules; and
a second display module coupled to the first display module to receive the subset of the plurality of image signals from the first display module,
wherein the transmitter is configured to transmit image signals by an electromagnetic wave method, and
each of the plurality of display modules comprises:
a plurality of light emitting devices;
a waveguide configured to receive an electromagnetic wave at a first end thereof and to guide the received electromagnetic wave to a second end opposite to the first end;
a receiver disposed on an outer surface of the waveguide and configured to sense the electromagnetic wave received through the waveguide, and to restore image signals from the sensed electromagnetic wave; and
a controller configured to extract an image signal corresponding to the display module from the restored image signals, and to provide each of the plurality of light emitting devices with a driving signal for outputting an image corresponding to the extracted image signal.

9. The display device as claimed in claim 8, wherein the waveguide of the first display module is configured to receive the electromagnetic wave transmitted from the transmitter at the first end thereof and to guide the received electromagnetic wave to the second end,
the second end of the waveguide of the first display module is configured to be connected to the first end of the waveguide of the second display module, and
the waveguide of the second display module is configured to receive the electromagnetic wave transmitted from the second end of the waveguide of the first display module at the first end thereof.

10. The display device as claimed in claim 8, wherein the waveguide includes:
a protruding member disposed on the first end of the waveguide and configured to be inserted into the second end of the waveguide of another display module; and
a door disposed on the second end of the waveguide, and configured to be selectively opened and closed, such that the door is opened when the protruding member of another display module is inserted into the second end of the waveguide.

11. The display device as claimed in claim 10, wherein the waveguide includes a groove region disposed in the waveguide and having a shape corresponding to a shape of the door, and
the door is configured to couple to the groove region when the protruding member of another display module is inserted into the second end of the waveguide.

12. The display device as claimed in claim 11, wherein the waveguide includes a slider disposed in the other side of the waveguide and configured to move the door to the groove region when the protruding member of another display module is inserted into the second end of the waveguide, and
the protruding member is configured to be separated into a plurality of pieces and to be coupled to the second end of the waveguide of another display module when inserted into the door of the another display module.

13. The display device as claimed in claim 8, wherein the base module includes a power supply device configured to supply power to each of the plurality of display modules,
wherein each of the plurality of display modules includes a metal frame disposed on an outer wall of the waveguide, and
wherein the first display module is configured to receive power from the power supply device, and to supply at least a portion of the received power to the second display module through the metal frame.

* * * * *